1,925,650

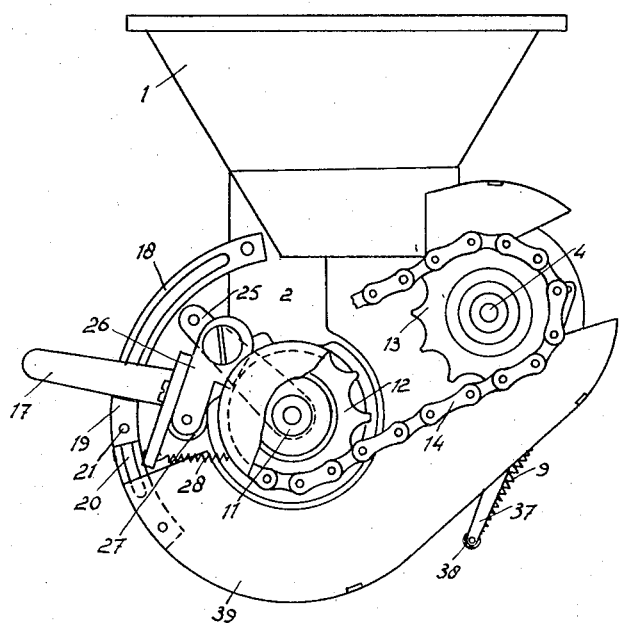
FIG: 1
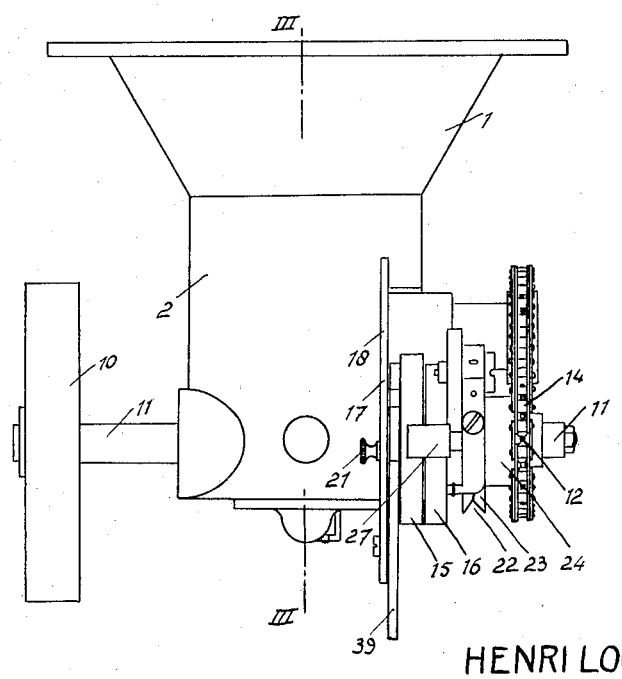
FIG: 2
HENRI LOUIS BECKER
ADRIANUS KLEIJN
INVENTORS
BY Haseltine, Lake & Co.,
ATTORNEYS Sept. 5, 1933. H. L. BECKER ET AL 1,925,650
MEASURING APPLIANCE FOR THE DELIVERY OF SEPARATED
QUANTITIES OF MATERIAL IN POWDER FORM
Filed March 22, 1932 2 Sheets-Sheet 2
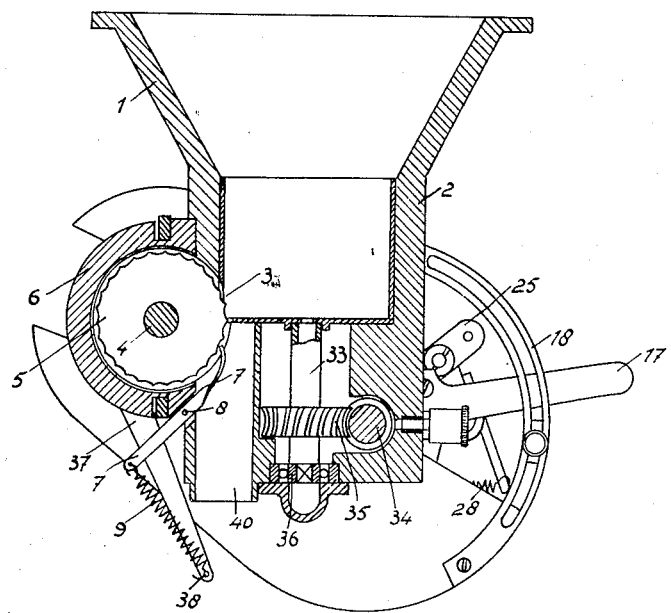
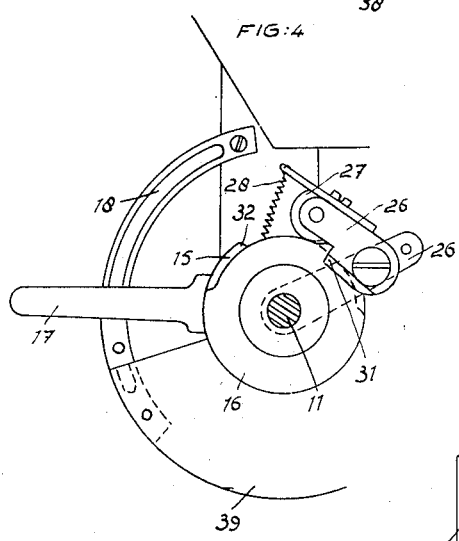
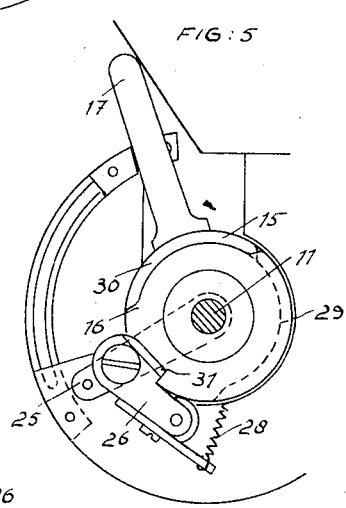
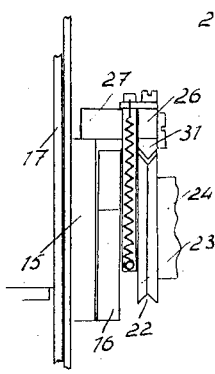
HENRI LOUIS BECKER
ADRIANUS KLEIJN
INVENTORS
BY *Haseltine, Lake & Co.*
ATTORNEYS Patented Sept. 5, 1933

UNITED STATES PATENT OFFICE 1,925,650

MEASURING APPLIANCE FOR THE DELIVERY OF SEPARATED QUANTITIES OF MATERIAL IN POWDER FORM

Henri Louis Becker, Schiedam, and Adrianus Kleijn, Rotterdam, Netherlands

Application March 22, 1932, Serial No. 600,410, and in Germany March 23, 1931

8 Claims. (Cl. 221—118)

The application refers to a regulating device for measuring appliances, which are used for the delivery of separate quantities of powdered material. This regulating device is for the purpose of controlling the angle through which the rotating separator of a measuring appliance turns at each impulse.

The invention is mainly characterized by discs arranged adjacent to one another, mounted loose on a common shaft so that they can rotate relatively to one another, and provided with recesses covering a part of their circumference, a control roller running over the circumference of the discs, the roller being attached to a pivoted arm held by a spring. This pivoted arm is carried round by the main shaft and by its motion connects or disconnects a coupling which is inserted between the driving shaft and the measuring wheel.

A method is thus provided for accurately separating quantities of powdered material in a given period of time. According to the invention the pivoted arm which carries the roller can be provided with a wedge-shaped part, which at the lowest position of the roller, that is when it is in the recesses of the discs, is pressed against the corresponding shaped rim of a freely rotating disc which is attached to the transmission wheel, this disc being mounted on the same shaft as the recessed discs.

A typical example of the invention is shown in the drawings.

Fig. 1 shows a side view of the measurer.

Fig. 2 shows a front view.

Fig. 3 shows a vertical section through line III—III in Fig. 2.

Figs. 4 and 5 show the control gear for regulating the quantity, showing two different positions of the lever, and Fig. 6 shows a front view of the control gear.

In the example shown in the drawings a funnel-shaped hopper is represented by 1 which can be provided with an extension on top, for instance, in the form of a glass cylinder. The hopper 1 leads down to a cylindrical part 2 which has an opening or slot 3 at the side near the bottom (Fig. 3) into which the teeth fit of a toothed wheel 5 which rotates about axis 4. This toothed wheel 5, which forms the delivery or measuring wheel, is enclosed in a suitable case 6. The end of a scraping lever 7 presses against the circumference of the toothed wheel 5, and rotates about the centre 8 and is held against the teeth of wheel 5 by spring 9. Shaft 4 and toothed wheel 5 are driven by a pulley 10 (Fig. 2) or by some other means, and actually from a gear shaft 11 (Fig. 2) which transmits its motion to shaft 4 through chainwheels 12 and 13 and a chain 14. A coupling, which can be cut in or out, is inserted in this drive. This consists of two discs 15 and 16 of similar diameter which are adjacent to one another and rotate freely on shaft 11. Disc 15 can be adjusted round shaft 11 by lever 17 (Figs. 1 and 2) the amount of adjustment being read on a scale on the segment 18. A part 19, whose position can be adjusted, is fitted into a slot 20 of segment 18 and is held in position by a screw 21. This is for the purpose of limiting the path of the hand or setting-lever 17. A coupling disc 23 provided with a wedge-shaped recess 22 is mounted loose on shaft 11 so that it can rotate independently of shaft 11 and of discs 15 and 16, and a chainwheel 12 is fixed on the boss 24 of this. A lever 25 is fixed to the driving shaft 11 and rotates with it and on which a link 26 is pivoted (Fig. 4), carrying a roller or control member 27. The link 26, and consequently roller or control member 27, are held by a spring 28 (Fig. 4) which causes the roller to press against the rims of the discs 15 and 16.

As will be seen from Figs. 2 and 6, the width of the roller is so chosen that it runs on the rims of both discs 15 and 16. These are provided with recesses 29 and 30 and they form a complete circle only in a definite position of their rims relatively to one another. When the driving shaft rotates, the arm 25 and the roller 27 are carried round with it, and, according to the relative positions of discs 15 and 16, that is, according to the position of the lever 17 attached to disc 15, the roller travels over the circumference of a complete circle or, during part of its travel, is pressed by spring 28 into the recesses 29 and 30 on the rims of discs 15 and 16. A wedge-shaped coupling part 31 is attached to the pivoted link 26 which carries the roller 27, and this, at the lowest position of link 26, that is, when the roller 27 is pressed into the recesses of discs 15 and 16 by spring 28, engages in the wedge-shaped recess 22 of disc 23 and thereby couples this disc 23 to the shaft 11. In this way the drive is transmitted from shaft 11 through coupling disc 23 to the gear wheel 12 and this, through chain 14, drives gear wheel 13 which is mounted on shaft 4 on which is also the measuring wheel 5. As soon as roller 27, after travelling over the rims of discs 15 and 16, leaves recess 29 or 30 (which is a long or short path according to the position of lever 17) and runs up the slanting surface 32 (Fig. 4) the link 26 is raised and consequently the wedge-shaped piece 31 is moved away from slot 22 of coupling disc 23. The chainwheel 12 is thereby disconnected from the driving shaft 11 and shaft 4 with the measuring wheel stops.

The coupling is so designed that by the eccentric arrangement of wedge clutch member 31, when it is drawn in the grip becomes tighter as the power transmitted increases. Manifestly, other equivalent clutch means could be used, as for example, a pawl and ratchet device.

By adjusting lever 17 it is possible to set the recesses 29 and 30 of discs 15 and 16 in relation to one another so that they form either none or a long or short recess for roller 27, and thus, through the transmission coupling, either disconnecting the measuring wheel or connecting it in for a longer or shorter period during its complete revolution. The period during which, that is the proportion of a complete revolution during which, the coupling is connected in can be set by and read on scale 18.

A suitable scoop or wing-type stirring gear, not shown in the drawings, is situated in the hopper 1, 2, and is mounted on and driven by vertical shaft 33 (Fig. 3) to loosen the powdered material or press it against the measuring wheel.

The stirrer shaft 33, which at its lower end runs in a ball bearing 36, is driven through worm gearing 34, 35. The arm 7, 8, which presses against measuring wheel 5, is held in position by spring 9, which is attached to a fixed arm 37 at its end 38 (Fig. 3). The plate 39, which can be seen in Figs. 2 and 4, acts as a support for the graduated sector 18. The material from the cylindrical part 2 of hopper 1, after passing the measuring wheel 5, leaves at the outlet 40 and is extracted or conveyed away by suitable means. The scraping arm 7 removes from the recesses between the teeth of the measuring wheel 5 any material which may have become lodged there, to ensure that the same amount of powdered material is always delivered.

The device according to the invention is simple and convenient and makes it possible to regulate within relatively wide limits the desired amount of powdered material in a given time.

What we claim is:—

1. In a powder dispensing apparatus having a powder container and a rotatable delivery wheel projecting partly into a delivery slot in said container, a regulating device for delivering stated quantities of powder from said container by means of said delivery wheel, including a pair of coaxially arranged disks loosely mounted upon a common shaft, a recessed portion upon the periphery of each disk, a radial arm rigid upon said shaft having a spring actuated lever pivoted upon the same, a control member upon said lever adapted to ride upon the peripheries of said disks and partially rotate the lever upon descending into the recessed portions of said disks, driving means for said apparatus, and a clutch device operable upon descent of said control member into said recessed portions to connect said driving means with said delivery wheel.

2. In a powder dispensing apparatus having a powder container and a rotatable delivery wheel projecting partly into a delivery slot in said container, a regulating device for delivering stated quantities of powder from said container by means of said delivery wheel, including a pair of coaxially arranged disks loosely mounted upon a common shaft, a recessed portion upon the periphery of each disk, a radial arm rigid upon said shaft having a spring actuated lever pivoted upon the same, a clutch disk loosely mounted upon said shaft and simultaneously rotatable with said delivery wheel, a control member upon said lever adapted to ride upon the peripheries of said disks and partially rotate the lever upon descending into the recessed portions of said disks, driving means for said apparatus, and a clutch member also mounted upon said lever adapted to make contact with said clutch disk upon descent of said control member into said recessed portions to connect said driving means with said delivery wheel.

3. Regulating device according to claim 2, wherein the clutch member is wedge-shaped while the clutch disk is grooved to be frictionally engaged by said wedge-shaped clutch member to provide the active connection between the driving means and the delivery wheel.

4. Regulating device according to claim 2, wherein the clutch disk is grooved while the clutch member is both wedge-shaped to frictonally engage in the groove of said disk to provide the active connection between the driving means and the delivery wheel, and eccentrically mounted upon the lever with respect to the axis thereof in order to increase the gripping effect of the clutch in proportion to the amount of power transmitted therethrough.

5. Regulating device according to claim 1, wherein a scale is provided and means including a lever which is shiftable with respect to said scale for angularly shifting the disks with respect to each other by partial rotation in order to expose more or less of the recessed portions of the peripheries of said disks to the control member.

6. Regulating device according to claim 2, wherein a scale is provided and means including a lever which is shiftable with respect to said scale for angularly shifting the disks with respect to each other by partial rotation in order to expose more or less of the recessed portions of the peripheries of said disks to the control member.

7. In a powder dispensing apparatus having a powder container and a rotatable delivery wheel projecting partly into a delivery slot in said container, a regulating device for delivering stated quantities of powder from said container by means of said delivery wheel, including a pair of coaxially arranged disks loosely mounted upon a common shaft, a recessed portion upon the periphery of each disk, a radial arm rigid upon said shaft having a spring actuated lever pivoted upon the same, a control member upon said lever adapted to ride upon the peripheries of said disks and partially rotate the lever upon descending into the recessed portions of said disks, driving means for said apparatus, a scale upon said apparatus, a lever which is shiftable with respect to said scale for angularly shifting said disks with respect to each other in order to expose more or less of the recessed peripheral portions thereof to the control member, a clutch disk loosely mounted upon said aforesaid shaft and simultaneously rotatable with said delivery wheel and having a grooved periphery, and a wedge-shaped clutch member also mounted upon said first mentioned lever which is pivoted upon said arm and adapted upon descent of said control member into said recessed portions to provide the active connecting means between said driving means and said delivery wheel by frictionally engaging in the groove of said clutch disk.

8. A regulating device according to claim 7, wherein the clutch member is both adapted to provide the active connection between the driving means and the delivery wheel, and is eccentrically mounted upon the lever which carries the control member eccentrically with respect to the axis of said lever in order to increase the gripping effect of the clutch in proportion to the amount of power transmitted therethrough.

HENRI LOUIS BECKER.
ADRIANUS KLEIJN.